Jan. 6, 1931.  G. J. MEYER  1,787,993
BOTTLE CLEANING MACHINE
Filed Jan. 24, 1925  3 Sheets-Sheet 1

WITNESSES
George Mueller
M. E. Downey

INVENTOR.
George J. Meyer
By R. S. Caldwell
ATTORNEY.

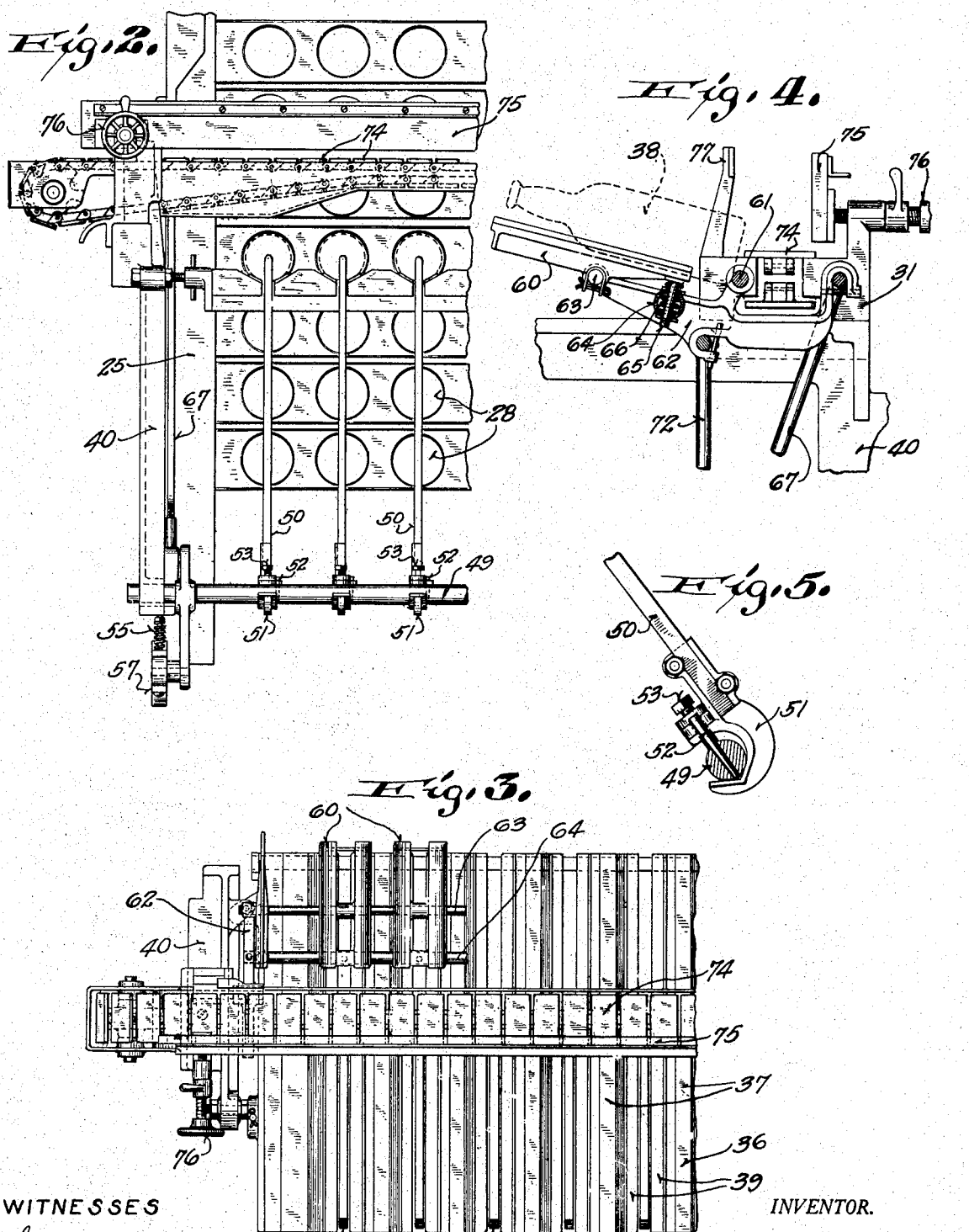

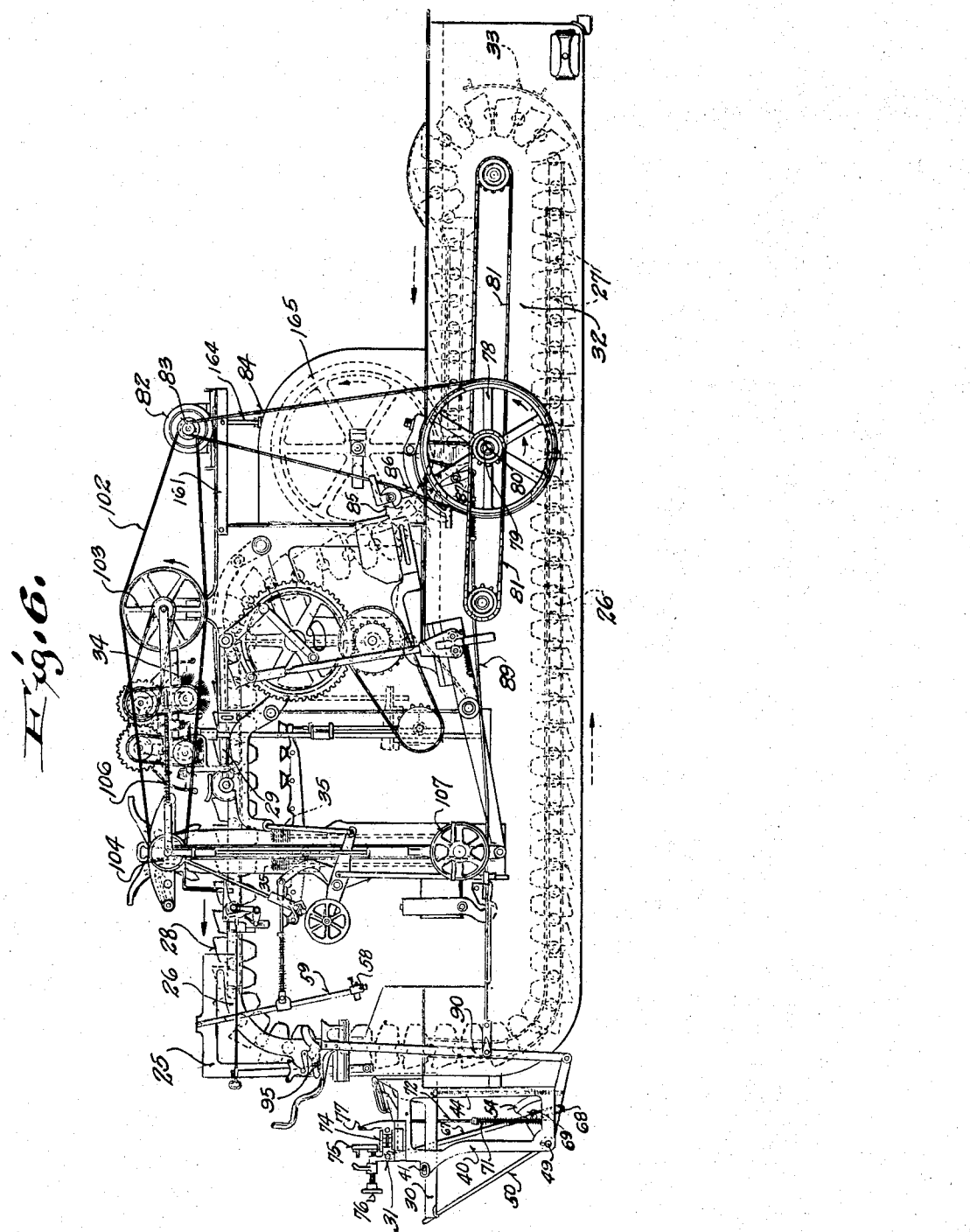

Patented Jan. 6, 1931

1,787,993

UNITED STATES PATENT OFFICE

GEORGE J. MEYER, OF MILWAUKEE, WISCONSIN, ASSIGNOR TO GEO. J. MEYER MANUFACTURING COMPANY, OF MILWAUKEE, WISCONSIN, A CORPORATION OF WISCONSIN

BOTTLE-CLEANING MACHINE

Application filed January 24, 1925. Serial No. 4,455.

The invention relates to bottle cleaning machines, more particularly of the type including a travelling bottle conveyor.

An object of the invention is to provide a bottle cleaning machine including a bottle conveyor and a bottle-receiving support associated with the conveyor for the transfer of bottles therebetween, the bottle-receiving support being yieldingly mounted for limited movement along the conveyor.

Another object of the invention is to provide a bottle cleaning machine and having a bottle loading device including an adjustable and yieldably-supported loader table from which bottles are moved into the conveyor of the machine, the adjustability of the table permitting a change in bottle sizes and its yielding support preventing breakage or damage of parts by jamming.

A further object of the invention is to provide a bottle cleaning machine having a bottle unloader incorporating a yielding bottle rest to accommodate bottles of different diameters and to prevent them from falling when being transferred to a conveyor.

Fig. 2 is a fragmentary end view of the loading and unloading mechanism;

Fig. 3 is a fragmentary top plan view of the loading and unloading mechanism;

Fig. 4 is a detail sectional view of a part of the unloading mechanism;

Fig. 5 is a fragmentary detail view of a loading finger, and

Fig. 6 is an elevation of one side of the bottle cleaning machine embodying the invention.

Figure 1:
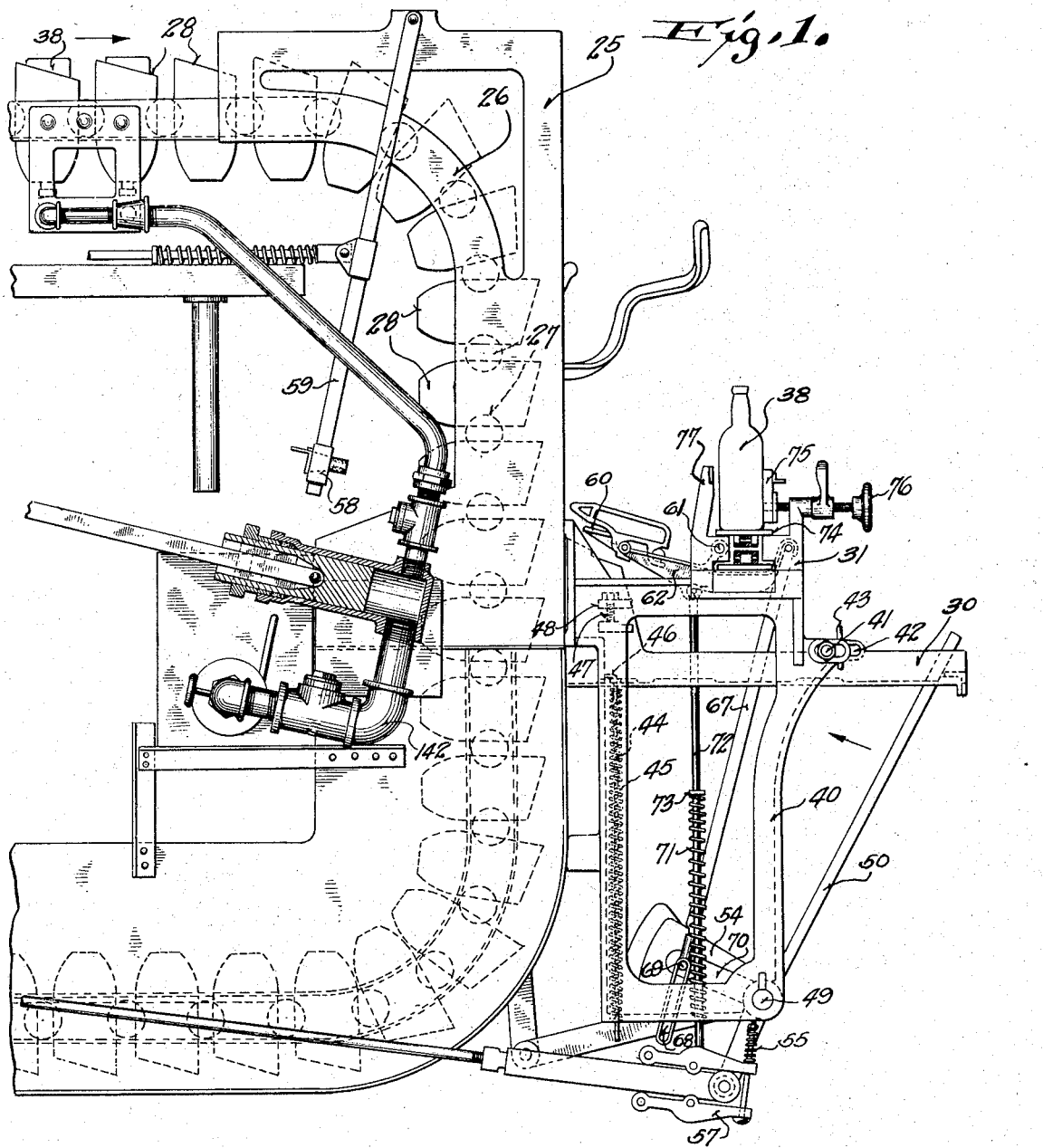
Fig. 1 is a fragmentary side elevation of the loading and unloading end of a bottle cleaning machine embodying the invention.

In these drawings the numeral 25 indicates a frame of suitable construction supporting angle and channel guides 26 on which travel the rollers 27 of conveyor chains, such chains carrying transversely-extending rows of bottle-holding pockets 28 in the manner shown in my United States Letters Patent No. 1,429,960, granted September 26, 1922. Also, as in the above patent, the conveyor is moved intermittently, step by step, by pusher bars 29 engaging the chains for moving the conveyor in its guides in the direction indicated by arrows. The conveyor has an upper horizontal travel and a lower horizontal travel and at the descending portion of its travel at one end of the machine, loading and unloading devices 30 and 31, respectively, hereinafter described, are adjacently disposed for attention by the same operator.

The entire lower portion of the conveyor travels within a soaking tank 32 containing a cleaning solution in which the bottles are soaked during their travel to the ascending portion of the conveyor, suitable guides 33 being provided upon which the bottles slide during their travel through the tank. The bottles enter the solution in a horizontal position, in which they are partly filled, and are then turned to a vertical position in which they are completely filled. Their intermittent travel through the tank causes agitation of the solution surrounding them, which aids in loosening the labels. The bottles leave the solution in an approximately horizontal position so that they remain partly filled and wet until they become inverted, in which position they are emptied of the solution, the solution being returned to the tank.

After thorough draining the bottles are rinsed and raised out of the conveyor pockets 28 to carry them against and between rotary cleaning brushes 34 for outside and bottom cleaning, as more particularly shown and described in the copending application Serial No. 7,862, of George J. Meyer, et al., filed February 9, 1925, and rotary brushes 35 are adapted to enter the bottles for inside cleaning. The bottles are then rinsed thoroughly, as more particularly shown and described in the above-mentioned U. S. Patent No. 1,429,960 and as hereinafter described, and allowed to drain during the remainder of their travel, so that they are practically dry by the time they are discharged at the end of the machine.

The loading device 30, as shown in Figs. 3 to 6, includes a horizontally disposed loading table 36 incorporating spaced strips 37 forming troughs in which the bottles 38 are placed, suitable metal guides 39 being provided on the strips along which the bottles may slide. The loading table is supported between end frames 40 by means of pivot pins 41 secured to the end frames and extending into slots 42 in the table, where they are held by removable locking pins 43, thereby permitting horizontal adjustment of the table when washing bottles of different lengths. The end of the table adjacent the bottle carriers is yieldingly supported by means of springs 44 urging the table upwardly to a normal horizontal position and guided by rods 45 passing through them and having hooked upper ends 46 engaging the table. The upward movement of the table is limited by vertically adjustable screws 47 threaded through lugs 48 in the end frames 40.

A shaft 49 is journalled transversely between the lower ends of the end frames 40 and carries spaced loading fingers 50 which project upwardly and enter the slots formed between the spaced strips 37 of the loading table. Each loading finger 50 includes a laterally forked lower portion 51 engageable with the shaft 49 on which it is held against relative rotation by a pin 52 transversely entering the shaft and a set screw 53 engaging the shaft. Each loading finger is thus individually removable from the shaft for repairs or replacement without disturbing the remaining fingers and without removing the shaft 49 from its bearings.

The inner ends of the bottle-receiving troughs on the loading table are positioned by means of the vertically adjustable screws 47 to register with the bottle-holding pockets 28 during the pauses in the travel of the conveyor as it descends past the loading table, and at such times the loading fingers 50 are swung forward by the shaft 49 to push the bottles into the pockets. This swinging movement of the loading fingers is effected by a counter-weight 54 secured to the shaft 49, the counterweight being permitted to act at timed intervals by means of suitable linkage including a lever 55 secured to the shaft and a power-driven cam wheel 56 journalled on the machine. In addition to the counterweight, spring means hereinafter described may also act on the shaft 49 to effect the loading operation. The bottles on the loading table are thus moved forward by the action of the counterweight 54 on the loading fingers 50, which are returned to their former position by means of the cam wheel 56 acting through the intermediate linkage. This linkage preferably includes a yielding releasable connection 57 which will separate when an obstruction, such as a misplaced bottle, prevents the backward travel of the loading fingers, thus avoiding damage and breakage of the parts. Since the counterweight 54 will exercise only a limited force in moving the bottles forwardly along the troughs in the loader table, any obstructions on the table, such as a misplaced bottle, will prevent the further forward movement of the loading fingers and thus avoid breakage of or damage to the mechanism. Upon such failure of the loading fingers to completely move the bottles into the pockets on the conveyor, so that they project above the adjacent edge of the loading table, the yielding support for the table will prevent damage during the following downward travel of the conveyor and give the operator an opportunity to stop the machine and remove the obstructing bottles.

The operation of unloading clean bottles from the machine takes place simultaneously with the loading operation and at substantially the same location, so that the same operator may supervise both operations. As the conveyor comes to rest to receive a row of bottles from the loader table, a transversely-extending bar 58 mounted on arms 59 pivoted at their upper ends on the frame of the machine is swung forwardly to strike the necks of a row of bottles to eject the bottles from the carriers, this row of bottle-carriers being in the descending portion of the conveyor a short distance above the point at which the bottles are loaded onto the conveyor. To receive the bottles as they fall from the carriers, inclined bottle guides or chutes 60 are mounted on a swinging unloading frame including a shaft 61 extending transversely of and journalled in the end frames 40, the bottles coming to rest with their bottoms against the shaft. The unloading frame includes spaced arms 62 secured intermediate their ends to the shaft 61 near the end frames 40 and carrying a pair of spaced transversely-extending bars 63 and 64 on the parts extending towards the bottle carriers. The bottle guides 60 are pivotally mounted on the bar 63 which is nearest the ends of the arms 62 and the lower ends of the bottle guides are provided with laterally extending guide pins 65 which project through the hollow bar or pipe 64 wherein a spring 66 surrounds each pin and bears against the bottle guide to afford a yielding mounting. The swinging unloader frame supporting the bottle guides is moved to a position to receive the bottles ejected from the bottle carriers by a rod 67 pivotally secured at the end of an unloader arm 62 opposite the bottle guides and having a slot 68 at its lower end in which is disposed a pin 69 secured to lever 70 attached to the oscillating shaft 49. The bottle-unloading frame is urged upwardly by a coil spring 71 acting through a rod 72 pivotally secured at its upper end to the swinging arm 62 and slidably mounted at its lower end in the end frame 40, the rod passing through the spring and provided with a collar 73 against which the spring bears. The unloading frame is held in bottle-receiving position against the action of the spring 71 by the rod 67, the lower slotted end of which bears on the pin 69 secured to the lever 70.

A bottle conveyor chain 74 extends transversely above the swinging unloader frame and is adapted to receive bottles therefrom when the latter is swung to an upright position. This operation is accomplished simultaneously with the loading operation during which the lever 70 on the shaft 49 moves downwardly to permit the spring 71 to swing the unloading frame and discharge the bottles in the bottle guides onto the conveyor chain 74 in a vertical position, the bottles being alined on the chain by their abutment against a stop member 75 supported and laterally adjustable with respect to the chain by locking screws 76 threaded in the end frames 40. Suitable stop abutments 77 may be provided to limit the discharging position of the swinging frame.

It will be seen that the force acting to swing the bottle-unloading frame is limited to that afforded by the spring 71 so that any misplaced bottle or other object obstructing the path of the frame will not cause damage or breakage of parts. However, in the event of such stoppage, the loading operation will not be interfered with since the slot 68 in the lower end of the rod 67 permits the continued travel of the lever 70 secured to the shaft 49, and consequently of the loader fingers 50 secured to the same shaft.

The spring 71 cooperates with the counterweight 54 in effecting the loading operation but the counterweight may act independently for the loading operation when the movement of the unloading frame is obstructed.

The pivoted bottle guides 60 are preferably so constructed that they may be readily removed from their supporting bars 63 and 64 without detaching the arms 62 or disturbing adjacent guides. The yielding mounting of each bottle guide afforded by the spring 66 permits them to conform to varying bottle diameters when the bottles are brought against the stop member 75 adjacent the conveyor chain 74 so that there will be no danger of broken bottles.

As seen in Fig. 6, a pulley 78 is mounted at the side of the machine on a horizontal shaft 79 which carries one or more sprockets 80 for transmission of power by chains 81 to various parts of the machine. A motor 82, or other suitable source of power, is mounted on the machine above the pulley, preferably vertically thereover, and carries a pulley 83 connected by a belt 84 to the pulley 78. An idler pulley 85 is journalled at the upper end of a swinging arm 86 and is adapted to engage the belt 84 to take up looseness therein when power is to be transmitted. The arm 86 is pivoted intermediate its ends on a pin 87 and has its lower free end connected by a rod 89 to an operating lever 90 in convenient reach of the attendant, so that a pull on the lever 90 will serve to swing the arm 86 in a direction to tighten the belt, the lever 90 being held in position by a latch 95.

A swinging frame 161 is provided to support the motor 82 and is held in position by a vertically adjustable strut 164 extending downwardly to a gear housing 165 or other stationary part of the machine.

The continuously rotating brushes for cleaning the inside and the outside of the bottles may be driven in any suitable manner, as by means including a belt 102 in engagement with a pulley on the motor 82 and passing over pulleys 103 and 104, which may be held apart by a spring-urged strut 106.

The swinging outside brushes 34 are driven from the pulley 103 through suitable intermediate gearing and serve to brush the outside and bottom surfaces of the bottles by insertion and rotation of the bottles between and against the brushes.

The mechanism for brushing the inside of the bottles includes a vertically reciprocating brush-spindle group driven through a pulley 107, as exemplified in United States Letters Patent Nos. 1,310,128 and 1,381,325 to George J. Meyer, granted July 15, 1919 and June 14, 1921, respectively.

What I claim as new and desire to secure by Letters Patent is:

1. In a bottle washing machine having a traveling bottle conveyor, a loader table having a plurality of bottle-receiving troughs adapted to register at their inner ends with the bottle conveyor, swinging fingers having their free ends disposed in said troughs and adapted to move the bottles along said troughs and into said bottle conveyor, and means for yieldingly supporting said table to permit its vertical movement by obstructing objects.

2. In a bottle washing machine having a traveling bottle conveyor, a loading table having a plurality of bottle-receiving troughs adapted to register at their inner ends with the bottle conveyor, stationary frames disposed at opposite ends of said table, pivot means for supporting the table therefrom, spring means for supporting said table to permit its vertical yielding, and swinging fingers having their free ends disposed in the troughs of said loading table for moving the bottles along said troughs and into said conveyor.

3. In a bottle washing machine having an intermittently-moving bottle conveyor including a descending portion, a loader table disposed adjacent said descending portion and having bottle-receiving troughs therein, swinging fingers having their free ends disposed in said troughs and adapted to move the bottles therealong and into said conveyor, spring means permitting the yielding of the discharge end of said table, and means for vertically adjusting said table for effecting the registration of its discharge end with the sometimes stationary bottle conveyor.

4. In a bottle washing machine having a traveling bottle conveyor including a descending portion, a loading table adjacent said descending portion and having bottle-receiving troughs therein means for moving bottles along said troughs to enter said bottle conveyor, stationary members at opposite ends of said table, and means for supporting said table from said stationary members in a substantially horizontal position permitting a horizontal shift of said table with respect to said bottle conveyor.

5. In a bottle washing machine, an intermittently-traveling bottle conveyor having bottle carriers, a loading table disposed adjacent a descending portion of said conveyor and having bottle-receiving troughs therein adapted to register at their inner ends with the bottle carriers during the pauses in the travel of the bottle conveyor, means for moving bottles along said troughs to enter the carriers, and means for yieldingly supporting said table to permit its vertical movement by obstructing bottles.

6. In a bottle washing machine, a bottle conveyor having bottle carriers and including a descending portion from which bottles are discharged, a swinging frame including a pair of spaced parallel bars, bottle-receiving guides mounted on said bars and assuming an inclined position to receive bottles ejected from said carriers, a stop against which bottles come to rest on said guides, a discharge conveyor, and means for swinging said frame to deposit bottles from said guides to said conveyor, said guides being pivotally mounted on one rod and yieldingly supported by the other to avoid cramping of said bottles when being loaded onto said discharge conveyor.

7. In a bottle washing machine, a bottle conveyor having bottle carriers and including a descending portion from which bottles are discharged, a swinging frame, bottle-receiving guides pivotally mounted intermediate their ends on said frame and yieldingly supported at one end, said guides assuming an inclined position in one extreme position of said swinging frame to receive bottles ejected from said carriers, a stop against which bottles come to rest on said guides, a bottle support, and means for swinging said frame to transfer the bottles from said guides to said support.

8. In a bottle washing machine, a bottle conveyor having bottle carriers and including a descending portion at which the bottles are discharged from the carriers, a swinging frame, bottle-receiving guides yieldingly mounted on said frame and assuming an inclined position in one extreme position of said frame to receive bottles ejected from said carriers, a stop against which bottles come to rest on said guides, a discharge conveyor, a stop member extending along said conveyor, screws supporting said stop member and mounted to effect a lateral adjustment of said stop member with respect to said discharge conveyor, and means for swinging said frame to transfer bottles from said guides onto said discharge conveyor and against said stop member.

9. In a bottle washing machine, a bottle conveyor having bottle carriers and including a descending portion at which bottles are discharged from the carriers, a swinging frame, stationary end frames on which said swinging frame is pivotally supported, bottle guides mounted on said swinging frame and assuming an inclined position in an extreme position of said swinging frame to receive bottles ejected from said carriers, a stop against which bottles come to rest on said guides, a discharge conveyor, a spring means normally urging the swinging frame upwardly, a rocker arm, and a connection between said rocker arm and swinging frame restraining the discharge movement of said frame whereby said spring will move said frame upwardly with a limited force to transfer bottles to said discharge conveyor, said connection when released by the movement of said rocker arm in one direction, effecting the return of said swinging frame to bottle-receiving position by the movement of said rocker arm in the opposite direction.

10. In a bottle washing machine, the combination of a travelling bottle conveyor having a bottle carriers, a bottle-receiving support disposed adjacent a portion of said conveyor for the transfer of bottles therebetween, and means for yieldingly mounting said support to permit its limited movement with said conveyor, whereby to facilitate registration of said support with respect to said conveyor during the transfer of bottles between said support and conveyor.

11. In a bottle washing machine, the combination of a travelling bottle conveyor including a descending portion at which bottles are loaded thereon, a bottle-receiving table disposed adjacent said descending portion of the conveyor for the transfer of bottles to said conveyor, and means for yieldingly mounting said table for limited movement with the conveyor, whereby to avoid damage incident to the incomplete transfer of bottles from said table to said conveyor.

12. In a bottle washing machine, the combination of a movable bottle conveyor, a bottle-receiving member adjacent said conveyor along which bottles are guided and urged into said conveyor, means for moving bottles from said member into said conveyor, the discharge portion of said bottle-receiving member being disposed in register with said conveyor, and means for yieldingly supporting said bottle-receiving member in a manner permitting movement thereof in a direction along the conveyor.

In testimony whereof, I affix my signature.

GEORGE J. MEYER.